United States Patent [19]

Akhter

[11] Patent Number: 5,599,621
[45] Date of Patent: Feb. 4, 1997

[54] COVER TAPE FOR SURFACE MOUNT DEVICE PACKAGING

[75] Inventor: Sohail Akhter, Brown Deer, Wis.

[73] Assignee: Brady Precision Tape Co., Milwaukee, Wis.

[21] Appl. No.: 537,420

[22] Filed: Sep. 29, 1995

[51] Int. Cl.$^6$ .......................... B65D 73/02; B65D 85/38; B32B 7/12
[52] U.S. Cl. .......................... 428/349; 428/354; 428/480; 428/922
[58] Field of Search ..................................... 428/349, 354, 428/343, 480, 922, 355

[56] References Cited

U.S. PATENT DOCUMENTS

| | | | |
|---|---|---|---|
| 4,963,405 | 10/1990 | Yamashita et al. | 428/354 X |
| 5,064,064 | 11/1991 | Itou et al. | 206/330 |
| 5,208,103 | 5/1993 | Miyamoto et al. | 428/354 |
| 5,346,765 | 9/1994 | Maeda et al. | 428/354 |
| 5,441,809 | 8/1995 | Akhter | 428/354 |
| 5,447,784 | 9/1995 | Williams et al. | 428/922 X |
| 5,478,616 | 12/1995 | Kochem et al. | 428/922 X |
| 5,478,644 | 12/1995 | Takahashi | 428/922 X |

FOREIGN PATENT DOCUMENTS 0501068  2/1991  European Pat. Off..
WO91/12187  8/1991  WIPO.

*Primary Examiner*—Daniel Zirker
*Attorney, Agent, or Firm*—Whyte Hirschboeck Dudek S.C.

[57] ABSTRACT

High clarity, tear resistant, static dissipative cover tapes for two-piece surface mount device packaging tapes are described comprising of backing film, e.g. a polyester film, one side of which is coated with a thin layer of heat-sealable adhesive, e.g. an adhesive comprising a styrenic block elastomer, and the other side of which is coated with an organic antistatic agent. The cover tapes of this invention can be used with carrier tapes made from a variety of materials, e.g. polystyrene, polyvinyl chloride, etc., and demonstrate a consistent peel force of between about 10 and about 120 grams.

22 Claims, 1 Drawing Sheet

COVER TAPE FOR SURFACE MOUNT DEVICE PACKAGING

BACKGROUND OF THE INVENTION

This invention relates to surface mount device packaging. In one aspect, the invention relates to a two-piece package for chip-type electronic parts, the package comprising a carrier tape and a cover tape, while in another aspect, the invention relates to a cover tape designed to dissipate static electricity that may be harmful to the electronic packaged parts. In yet another aspect, the invention relates to a heat-sealable, high clarity, tear resistant cover tape.

Surface mount device (SMD) tape is a two-part packaging tape for chip-type electronic parts, e.g. integrated circuits, inductors, transistors, resisters, capacitors, diodes, etc. SMD tape comprises a carrier tape with punched or embossed cavities for holding the part and a cover tape adapted to be heat-sealed to the carrier tape. The carrier tape is typically constructed of polyvinyl chloride, polyester, polypropylene or polystyrene, and the cover tape is typically constructed of polyester to which a heat-sealable adhesive is coated onto one side.

In use, the carrier tape and the cover tape are stored on separate rolls or reels. The carrier tape is unwound from its storage reel and extended in a linear fashion such that parts can be inserted into its cavities. As the parts are inserted, the cover tape is applied along the linear length of the carrier tape such that the adhesive coated side of the cover tape comes into contact with the carrier tape. The cover tape and carrier tape are in contact with one another at their linear edges, and the adhesive on the cover tape is activated (rendered tacky) by the application of heat at those points in which it is in contact with the carrier tape. The heat is provided in a sufficient amount, balanced with an appropriate amount of pressure and dwell time, to activate the adhesive such that a bond of uniform strength is obtained across the length of the SMD tape. The heat and pressure can be applied by any one of a number of different techniques, e.g. hot air guns, drag shoes, ultrasonics, reciprocating sealing shoes, heated pinch rollers, etc. The adhesive carried on the cover tape that is not subjected to the heat and pressure is not activated and as such, it remains nontacky.

SMD tapes must possess a number of certain characteristics if they are to be useful as packages for electronic parts. Since most electronic parts are sensitive to static electricity, SMD tapes should be static dissipative (e.g. having a resistivity between about $10^5$ and about $10^{12}$ ohms/sq) so that if any static electricity is generated due to friction from contact between the cover tape and the part, then it is dissipated through the SMD tape. The cover tape part of these tapes are also sufficiently transparent to permit any writing (e.g. part numbers, manufacturer's name, etc.) that is borne by most electronic parts to be read through the cover tape.

Peel force is another important property of SMD tapes. Peel force is the force required to remove a cover tape from a carrier tape after the former has been heat-sealed to the latter. If the peel force is too low, e.g. less than 10 g, then the cover tape can loosen from the carrier tape during packing or shipping and the packaged part can be lost. If the peel force is too high, e.g. more than 120 g, then the carrier tape can move or "jump" during the unsealing or "detaping" operation and the packaged part either lost or positioned in such a manner that it is not accessible to a robotic arm programmed to remove it from the carrier tape pocket to its assembly point. The peel force of the SMD tape is the function of a number of different variables including, but not limited to the chemical composition of the adhesive, the method by which the adhesive was activated at the time it was applied to the carrier tape, the conditions to which the SMD tape was subjected from the time of sealing to the time of unsealing, and the amount of time that elapsed between sealing and unsealing Another aspect of the cover tape that is important to an effective SMD tape is the nature of the adhesive that is coated onto one of its sides. The adhesive must be activated when exposed to sufficient heat, but remain inactive in the absence of such heat. Moreover, only that portion of the adhesive that is subjected to heat and/or pressure should activate, i.e. the lineal edges of cover tape, such that the adhesive at the center of the tape (and over the packaged part) remains nontacky and does not leave a residue on the packaged part should it come in contact with it. Furthermore, the adhesive should not cause blocking when the cover tape is removed from its storage roll for application onto the carrier tape, and it should be sufficiently clear so as not to haze or otherwise reduce the transparency of the backing film to which it is applied such that writing on the packaged parts is obscured. This latter consideration of cover tape clarity is becoming increasingly important in view of the ever decreasing size of the parts, and the movement to laser marking of the parts (laser markings generally providing poor contrast between the part and the marking).

Yet another important aspect of the cover tape is its tear resistance. If the tape tears during a detaping operation on pick and place assembly line, the whole line has to be shut down to replace the defective reel. With the ever increasing speeds of pick and place equipment, the tapes are being subjected to increasing speeds (now in excess of 300 mm/min) of detaping and hence increasing tear forces. As such, the tear resistance property of a cover tape continues to grow in importance.

Various SMD tapes are known (e.g. U.S. Pat. Nos. 5,441,809, 5,346,765, and 5,208,103, all of which are incorporated herein by reference) and commercially available, but all are subject to improvement. Some tapes demonstrate good ability to dissipate static electricity, but the cover tape tends to be hazy. Good dissipation of static electricity generally requires a relatively high loading (more than 30 weight percent) of conductive metal in the adhesive, and this imparts a haze to the optics of the cover tape. Moreover, the backing film of some cover tapes is metallized, i.e. it is coated with a thin layer of metal on one side to impart electrical conductivity to the cover tape, and this reduces light transmission through the cover tape. Some tapes demonstrate relatively good optical properties, but their ability to dissipate static electricity is less than fully desirable, e.g. they possess a resistivity in excess of $10^{12}$ ohms/sq.

SUMMARY OF THE INVENTION

According to this invention, a low haze, high visible light transmission, tear resistant, static dissipative, heat-sealable cover tape is provided that has a peel force of between about 10 and about 120 grams after heat-sealed to a carrier tape to form a two-piece package for electronic parts. The cover tape comprises a polymeric film one side of which is coated with at least one organic antistatic agent, and the other side of which is coated with a heat-sealable adhesive. The cover tapes of this invention can be heat sealed to any conventional carrier tape, and do not block under normal storage and use conditions.

Preferably, the heat-sealable adhesive comprises at least one:

1. Thermoplastic base elastomer comprising a styrenic block copolymer,
2. At least one first modifying agent comprising an acrylic copolymer,
3. At least one microspherical antiblock agent, and
4. At least one organic antistatic agent.

Optionally and preferably, the adhesive contains at least one second modifying agent comprising a polyester.

BRIEF DESCRIPTION OF THE DRAWING

The FIGURE is a schematic depiction of a cross-section of one embodiment of a cover tape of this invention.

DESCRIPTION OF THE PREFERRED EMBODIMENTS

Figure 1:
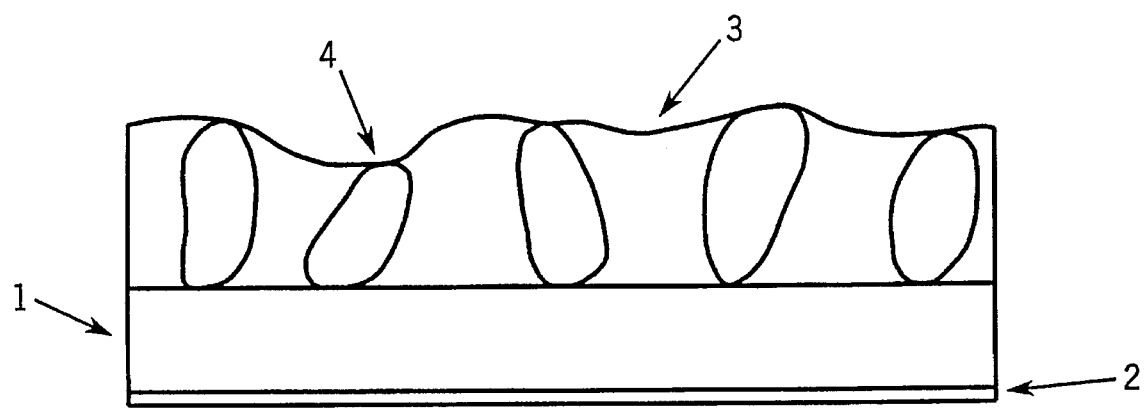

The cover tapes of this invention comprise three basic components, i.e. a backing film, a heat-sealable adhesive, and an organic antistatic agent. The heat-sealable adhesive is coated to one side of the backing film while the organic antistatic agent is coated to the other side of the backing film. The resulting structure is a three layer laminate with the first or adhesive layer designed for sealing with the carrier tape and dissipating static electricity generated by friction from the parts carried within the carrier tape; the second or backing film layer designed to provide the structural strength and integrity of the cover tape; and the third or antistatic layer designed to dissipate static electricity orginating from sources outside of the tape (e.g. friction generated on the packaging tape storage reel, etc.).

The backing film can be made of any material that is relatively transparent and exhibits good mechanical strength, e.g. polyester, nylon, polypropylene, etc. These films are typically between 0.5 and 5, preferably between 0.75 and 2, mils in thickness, and they exhibit a high degree of transparency. Films made of polyester, e.g. E. I. Du Pont de Nemours Co. Mylar® 92D, American Hoechst 2600 polyethylene terephthalate film, etc., are preferred.

The backing films of this invention are unmetallized, i.e. they do not carry a metallic layer as those taught in U.S. Pat. No. 5,441,809. The presence of a metal component in these films, while within the scope of this invention in the form of an antiblock agent, is generally disfavored because the metal detracts from the light transmission property of the film. In any event, with the presence of a first organic antistatic agent in the form a coating on one side of the film and a second organic antistatic agent component in the adhesive coating on the other side of the film, metal is not needed to impart a static electrical charge dissipation property to the packaging tape. The first and second organic antistatic agents can be the same or different. The first organic antistatic agent is usually applied to the backing film first as a very thin (i.e. submicron thickness) coating using conventional techniques.

The heat-sealable adhesive used in the practice of this invention comprises at least one (i) thermoplastic elastomer comprising a styrenic block copolymer, (ii) a first modifying agent comprising an acrylic polymer, (iii) optionally and preferably a second modifying agent comprising a polyester, (iv) a microspherical antiblock agent, and (v) an organic antistatic agent. The adhesive may also contain other components, such as a tackifying agent, a plasticizing agent, an antioxidant, and the like.

Any thermoplastic elastomer comprising one or more styrenic copolymers can be used in the formulation of these heat-sealable adhesives, and the following are illustrative: Kraton® G1650, Kraton® G 1657 and Kraton® G 1652 (all styrene-ethylene/butylene-styrene block copolymers); Kraton® FG1901X and Kraton® FG1921X (both maleic anhydride graft-modified styrene-ethylene/butylene-styrene block copolymers); and Kraton® D1101 and Kraton® D1102 (both styrene-butadiene-styrene block copolymers), all from Shell Chemical Company. Elastomers comprised of a blend of Kraton® G1657 and Kraton® G1652 are preferred. These elastomers often comprise minor amounts of various additives, e.g. antioxidants.

Any acrylic copolymer that is clear and compatible with the thermoplastic elastomer and the second modifying agent can be used as the first modifying agent in the practice of this invention. The purpose of this first modifying agent is to impart a smoother peeling behavior to the adhesive. These acrylic copolymers are characterized by random repeating units of different acrylic monomers, e.g. methyl acrylate, methyl methacrylate, ethyl acrylate, ethyl methacrylate, acrylic acid, and the like. The following copolymers are representative: Acryloid® grades from Rohm & Haas Co., and the Joncryl® grades from S. C. Johnson and Son, Inc. Acryloid® B48N (a copolymer of methyl methacrylate and other acrylic monomers) is a preferred first modifying agent.

Any polyester that is clear and compatible with the thermoplastic elastomer and the first modifying agent can be used as the optional second modifying agent in the practice of this invention. As here used, "polyester" includes both the traditional products of the polycondensation of dicarboxylic acids with dihydroxy alcohols, and such traditional products prepared with additional monomers, e.g. diamines, diisocyanates, etc., these latter products also known as copolyesters. The purpose of this second modifying agent is to enhance the binding properties and the peel profile of the adhesive, particularly the adhesion to the polyester backing. The preferred polyesters used in this invention are characterized by aromatic linkages in the polymer backbone, and the following polyesters are representative: Mor-ester® grades from Morton Chemical Co., Vitel® grades from Shell Chemical Co., and Estane® grades from B. F. Goodrich Chemical Group. Mor-ester® 49001 (a polyester resin) is a preferred second modifying agent.

The microspherical antiblock agent typically consists of one or more thermoplastic polyolefins such as an ethylene-vinyl acetate or vinyl chloride copolymer, or a micronized polymer powder of an ethylene-vinyl acetate, fluorocarbon or vinyl chloride type, or a micronized wax or metal oxide fine powder, or ceramic microspheres. The thermoplastic polyolefin microspheres are the preferred microspheres of this invention. Since the microspheres often are the dominant source of haze in the adhesive, the antiblock agent is typically present in an amount of not greater than 50, preferably not in excess of 25 and more preferably not in excess of 15, weight percent based upon the total weight of the adhesive. The typical average particle size (i.e. diameter or longest length of a representative cross-section) of the microspheres is less than about 200 microns, and preferably it is less than about 25 microns. The preferred antiblock is vinyl acetate/vinyl chloride copolymer powder available from Occidental Chemical Company under the OXY® trademark.

Any organic material that will conduct electricity can be used as the antistatic agent of the heat-sealable adhesive formulation. This material is present in relatively small quantities, e.g. about 1 to about 2 weight percent based on the weight of the formulation, is a liquid or paste, and is compatible with the other components of the adhesive formulation such that it does not significantly impair the clarity of the backing film. The antistatic agent is used in an amount sufficient to impart a resistivity to the cover tape of less than $10^{11}$ ohms/square (e.g. cm$^2$, in.$^2$, etc.), preferably less than $10^{10}$ ohms/square. Representative antistatic agents include Zelec® NE a paste antistatic agent available from E. I. Du Pont de Nemours Co.; Markstat® AL-26, a quatenary ammonium compound available from Witco Chemical Corp.; Cyastat® 609 available from Cytec Industries; Larostat® 902A, a liquid antistatic agent available from PPG Industries; and Armostat™ 410, a liquid antistatic agent available from Akzo Corp. Markstat® AL-26 is a preferred antistatic agent.

Representative of the optional tackifying agents are: Regalrez® 1126, Regalrez® 1018, Regalrez® 1033, Regalrez® 1065, Regalrez® 1078, Regalrez® 1094, Regalrez® 3102 and Regalrez® 6108 (all agents comprising one or more aliphatic or cycloaliphatic hydrocarbons available from Hercules Inc.); Kristalex® 3085, Kristalex® 3100, Kristalex® 1120, Kristalex® 5140, Endex® 155 and Endex® 160 (all agents comprising one or more aliphatic or cycloaliphatic hydrocarbons in combination with one or more aromatic hydrocarbons, also available from Hercules Inc.); and Nevchem® 140 (a crystalline terpene resin available from Neville Chemical Company). If a tackifying agent is present, then Regalrez® 1126 is a preferred tackifying agent.

Any material that will facilitate processing and increase the flexibility and toughness of the adhesive can be used as an optional plasticizer in the heat-sealable adhesive, and typical of these are the nonvolatile organic liquids and low melting solids such as the phthalate, adipate and sebacate esters; polyols such as ethylene glycol and its derivatives; tricresol phosphate; and the like. Mineral oil available from Witco Corporation under the trademark Kaydol® is a preferred plasticizer for use in the heat-sealable adhesives used in this invention.

Other additives, e.g. antioxidants, UV-inhibitors, dyes, etc., can be present in the adhesive formulations of this invention, but these are generally not necessary to the performance of either the adhesive or the cover tape and as such, such additives are generally not included in the formulations (other than to the extent that such additives are present as an additive to one or more of the commercially obtained components of the formulation).

The relative amounts of the components of the heat-sealable adhesive can vary with the nature of the cover tape, carrier tape, and the conditions of application and use, but the amounts reported in the table below are illustrative. All ranges are reported in weight percent based upon the total weight of the formulation.

BEAT-SEALABLE ADHESIVE FORMULATIONS

| Component | Broad Range | Preferred Range | Most Preferred Range |
| --- | --- | --- | --- |
| Elastomer | 60–90 | 70–90 | 75–85 |
| First Modifying Agent | >0–30 | 5–25 | 10–20 |
| Second Modifying Agent | 0–20 | 0.5–10 | 0.5 5 |
| Antiblock | 1–20 | 1–10 | 2–5 |
| Antistatic Agent | 0.2–10 | 0.5–5 | 0.5–2 |

The heat-sealable adhesive is applied to one side of the backing film in any convenient manner, e.g. spraying, dipping, roll coating, etc. The adhesive is applied as a very thin layer, e.g. between about 12 and about 50 microns, to the film such that it forms a conductive pathway throughout the tape by which static electricity can be dissipated.

One embodiment of a cover tape of this invention is further described by reference to the FIGURE which depicts a covertape in cross-section. The covertape comprises a polymeric backing film 1 coated on one side with a thin layer of organic antistatic agent 2. Heat-sealable adhesive 3 is coated to the other side of the covertape, and it contains microspherical antiblock agent 4. Antiblock agent 4 reduces the surface area of adhesive 3 on backing film 1 such that the adhesive does not come into intimate contact with the top side of the backing film, when the tape is wound on itself during the production of a roll of wound tape, i.e. it prevents blocking.

The cover tapes of this invention are used in the same manner as known cover tapes, i.e. they are stored on reels and when needed, are drawn from the reels and heat-sealed to a carrier tape containing parts to be packaged. The cover tapes of this invention do not exhibit blocking when removed from the storage reel, even at temperatures as high as 125° F., and are readily sealed to carrier tapes made from polystyrene at temperatures as low as 300° F. (sealing to carrier tapes made from other materials, e.g. polyvinyl chloride, may require different conditions of temperature, pressure, dwell time, etc., but the determination of these conditions are well within the skill of the ordinary artisan). The tapes exhibit high clarity (i.e. low haze and high light transmission) and excellent tear resistance, and the adhesive not activated during the sealing operation remains nontacky even over extended periods of time. Most importantly, the tapes of this invention demonstrate a uniform peel strength of between about 10 and about 120, preferably between about 30 and about 80, grams when sealed and unsealed in a conventional manner.

Conventional conditions for sealing a cover tape (including those of this invention) to a conventional carrier tape (e.g. polystyrene, polyvinyl chloride, etc.) include a temperature of between about 250° and about 450° F., preferably between about 275° and about 400° F.; a pressure of between about 15 and about 60 psi, preferably between about 20 and about 50 psi; and a dwell time, i.e. the time over which the cover and carrier tapes are in contact with one another under the sealing temperature and pressure, of between about 0.1 and about 1 seconds.

Conventional unsealing or detaping conditions include ambient temperature and pressure, a peel angle between about 90 and 180 degrees, preferably between about 135 and 180 degrees; and a peel speed between about 200 and about 400 mm/min, preferably between about 250 and about 350 mm/min. Peel strength is conveniently measured on a Systemation TP-150 Peel Strength Analyzer.

As here used, "haze" refers to the light scattering property of the cover tape, low haze films scattering less visible light than high haze films. The low haze films of this invention scatter less than about 30, preferably less than about 20 and more preferably less than about 15, percent of the visible light directed at the film, as measured by a conventional haze measuring instrument such as the Hazegard® XL-211 meter by Byk Gardner. As here used, "transparency" or "light transmission" refers to the amount of visible light that passes through a film. The cover tapes of this invention typically transmit at least about 70, preferably at least about 80 and more preferably at least about 90, percent of the visible light directed at the film and as measured by a conventional light transmission measuring instrument such as the Hazegard®

XL-211 meter by Byk Gardner. Conventional tapes generally exhibit one or the other of these desirable properties, but not both properties.

The following examples are illustrative of various specific embodiments of this invention. Unless otherwise noted, all parts and percentages are by weight.

SPECIFIC EMBODIMENT

Example 1

A heat-sealable cover tape adhesive was formulated with the following composition:

TABLE I

| FOUR COMPONENT ADHESIVE FORMULATION | | |
|---|---|---|
| Component | Description | wt % |
| Elastomer | Kraton ® G1652X (Shell Chemical Co.) | 86.51 |
| Acrylic Modifier | Acryloid ® B48N (Rohm & Haas Co.) | 9.61 |
| Antiblock Agent | OXY ® 521 (Occidental Chemical Co.) | 2.91 |
| Antistatic Agent | Markstat ® AL-26 (Witco Chemical Co.) | 0.97 |

The above components were mixed together in toluene solvent at a 25% solids content using a blade mixer. The resulting mixture was then coated onto the uncoated side of a Mylar® 92D polyester film (polyethylene terephthalate) of 1 mil thickness using a drawdown bar of appropriate clearance such that the final dried thickness of the coating was about 1.5 mils. The other side of the film was previously coated with a 0.05% solution of Markstat® AL-26 antistatic agent in isopropanol using a number 5 rod. This produced an antistatic coating of less than 0.1 micron in thickness. The resulting cover tape was sealed to a polystyrene carrier tape on a ST-60 sealer (made by Systemation Corp. at 40 psi and 350° F. temperature using a dwell time of 0.3 secs. The cover tape properties are reported in the Table III below.

Example 2

The procedure of Example 1 was repeated using the following components:

TABLE II

| SIX COMPONENT ADHESIVE FORMULATION | | |
|---|---|---|
| Component | Description | wt % |
| First Elastomer | Kraton ® G1652 (Shell Chemical Co.) | 68.00 |
| Second Elastomer | Kraton ® G1657X (Shell Chemical Co.) | 12.00 |
| Acrylic Modifier | Acryloid ® B48N (Rohm & Haas Co.) | 14.30 |
| Polyester Modifier | Mor-ester ® 49001 (Morton International) | 0.95 |
| Antiblock Agent | OXY ® 521 (Occidental Chemical Co.) | 3.80 |
| Antistatic Agent | Markstat ® AL-26 (Witco Chemical Co.) | 0.95 |

The properties of this cover tape are reported in the Table III below:

TABLE III

| COVER TAPE PROPERTIES | | |
|---|---|---|
| Property | Ex. 1 | Ex. 2 |
| Haze[1] | 12% | 15% |
| Light Transmission[1] | 92% | 92% |
| Resistivity[2] | $10^9$–$10^{10}$ ohms/square | $10^9$–$10^{10}$ ohms/square |
| Blocking[3] | None | None |
| Peel Force[4] | 30–80 g | 30–70 g |
| Tearing[5] | None | None |

[1]As measured by Hazegard ® meter XL-211 (manufactured by Byk Gardner).
[2]As measured by a three point probe meter model SRM-110 (manufactured by Pinion Corporation).
[3]Does not stick to itself or the carrier material unless activated by heat.
[4]When sealed to polystyrene carrier at 350 F. on a ST-60 sealer (manufactured by Systemation Corp.).
[5]No tearing of tape when peeled from carrier at 5 m/sec or a rapid, jerky pull by hand As the data of Table III reports, the cover tapes of this invention exhibit excellent haze and light transmission properties without sacrificing resistivity, peel force and tear resistance.

Although the invention has been described in considerable detail through the preceding example, this detail is for the purpose of illustration only. Many variations and modifications can be made by one skilled in the art without departing from the spirit and scope of the invention as described in the appended claims.

What is claimed is:

1. A low haze, high light transmission, static dissipative, heat-sealable, tear resistant cover tape comprising an unmetallized backing film one side of which is coated with an adhesive composition and the other side of which is coated with a first organic antistatic agent, the adhesive composition comprising at least one:

A. Thermoplastic elastomer comprising a styrenic block copolymer,
   B. Acrylic copolymer modifying agent,
   C. Antiblock agent comprising thermoplastic polyolefin microspheres, and
   D. Second organic antistatic agent.

2. The cover tape of claim 1 in which the adhesive composition further comprises a polyester modifying agent.

3. The cover tape of claim 2 with a haze of less than about 30 percent.

4. The cover tape of claim 2 with a haze of less than about 15 percent.

5. The cover tape of claim 3 with a visible light transmission greater than about 70 percent.

6. The cover tape of claim 4 with a visible light transmission greater than about 90 percent.

7. The cover tape of claim 5 with a peel force between about 30 and about 80 grams.

8. The cover tape of claim 6 with a peel force between about 30 and about 80 grams.

9. The cover tape of claim 7 in which the backing film is a polyester film.

10. The cover tape of claim 9 in which the styrenic block copolymer of the thermoplastic elastomer is at least one of styrene-ethylene/butylene-styrene or styrene-butadiene-styrene.

11. The cover tape of claim 10 in which the acrylic copolymer comprises units of methyl methacrylate.

12. The cover tape of claim 11 in which the polyester comprises aromatic linkages in the polymer backbone.

13. The cover tape of claim 12 in which the antiblock agent comprises at least one of ethylene-vinyl acetate and ethylene-vinyl chloride.

14. The cover tape of claim 13 in which the organic antistatic agent of the adhesive composition comprises a quartenary ammonium compound.

15. The cover tape of claim 14 in which the adhesive formulation further comprises a tackifying agent.

16. The cover tape of claim 15 in which the tackifying agent comprises at least one of an aliphatic or cycloaliphatic hydrocarbon.

17. The cover tape of claim 14 in which the adhesive formulation further comprises a plasticizer.

18. The cover tape of claim 17 in which the plasticizer is a mineral oil.

19. A low haze, high light transmission, static dissipative, heat-sealable tear resistant cover tape comprising an unmetallized backing film one side of which is coated with an adhesive composition and the other side of which is coated with a first organic antistatic agent, the adhesive composition comprising, in weight percent based on the weight of the adhesive composition, between about:

A. 60 and about 90 percent of at least one thermoplastic elastomer comprising a styrenic block copolymer, B. greater than 0 and about 30 percent of at least one acrylic copolymer modifying agent, C. 1 and about 20 percent of at least one antiblock agent comprising thermoplastic polyolefin microspheres, and D. 0.2 and about 10 percent of at least one second organic antistatic agent.

20. The cover tape of claim 19 in which the adhesive composition comprises, in weight percent based on the weight of the adhesive composition, between about:

A. 75 and about 85 percent of at least one thermoplastic elastomer comprising a styrenic block copolymer, B. 10 and about 20 percent of at least one acrylic copolymer modifying agent, C. 2 and about 5 percent of at least one antiblock agent comprising thermoplastic polyolefin microspheres, and D. 0.5 and about 2 percent of at least one second organic antistatic agent.

21. The cover tape of claim 19 in which the adhesive composition further comprises between about greater than 0 and about 20 percent of at least one second modifying agent comprising a polyester.

22. The cover tape of claim 20 in which the adhesive composition further comprises between about 0.5 and about 5 percent of at least one polyester modifying agent.

\* \* \* \* \*

UNITED STATES PATENT AND TRADEMARK OFFICE
CERTIFICATE OF CORRECTION

PATENT NO. : 5,599,621

DATED : February 4, 1997

INVENTOR(S) : AKHTER, Sohail

It is certified that error appears in the above-indentified patent and that said Letters Patent is hereby corrected as shown below:

Col. 1, line 14, replace "two-pan" with --two-part--;

Col. 5, line 55, replace "BEAT-SEALABLE" with --HEAT-SEALABLE--.

Signed and Sealed this

Thirteenth Day of May, 1997

*Attest:*

BRUCE LEHMAN

*Attesting Officer*  *Commissioner of Patents and Trademarks*